(12) United States Patent
Kamimura

(10) Patent No.: US 9,994,092 B2
(45) Date of Patent: Jun. 12, 2018

(54) PANEL STRUCTURE

(71) Applicant: TOYOTA JIDOSHA KABUSHIKI KAISHA, Toyota-Shi, Aichi-Ken (JP)

(72) Inventor: Shinya Kamimura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 14/962,638

(22) Filed: Dec. 8, 2015

(65) Prior Publication Data
US 2016/0167495 A1    Jun. 16, 2016

(30) Foreign Application Priority Data
Dec. 15, 2014  (JP) ................................. 2014-253304

(51) Int. Cl.
*B60J 5/10*  (2006.01)
*B60J 5/04*  (2006.01)

(52) U.S. Cl.
CPC ............. *B60J 5/107* (2013.01); *B60J 5/0469* (2013.01)

(58) Field of Classification Search
CPC ... B60J 5/107; B60J 1/18; B60J 5/0402; B60J 5/0469; B60R 13/07
USPC .......... 52/309.1; 296/76, 901.01, 201, 146.3, 296/146.5, 146.9
See application file for complete search history.

(56) References Cited

U.S. PATENT DOCUMENTS

| | | | |
|---|---|---|---|
| 4,822,098 A * | 4/1989 | Vogt .......................... | B60J 5/101 296/146.5 |
| 6,211,492 B1 * | 4/2001 | Tanaka .................. | B29C 65/342 156/273.9 |
| 6,439,649 B1 * | 8/2002 | Lorenzo ................. | B62D 33/00 296/181.3 |
| 8,056,302 B2 * | 11/2011 | Uto .......................... | B60J 5/045 114/117 |
| 8,087,720 B2 * | 1/2012 | Wang .................... | B62D 25/105 29/509 |
| 8,226,151 B2 * | 7/2012 | Miyake .................... | B60J 5/107 296/106 |
| 8,632,118 B2 * | 1/2014 | Song .................... | B21D 39/021 156/216 |
| 2007/0145768 A1 * | 6/2007 | Saitoh ...................... | B60J 5/101 296/146.5 |
| 2009/0066113 A1 * | 3/2009 | Kiriakou .................. | B60J 5/107 296/146.15 |

(Continued)

FOREIGN PATENT DOCUMENTS

| EP | 0266514 A2 | 5/1988 |
|---|---|---|
| EP | 2036750 A2 | 3/2009 |

(Continued)

OTHER PUBLICATIONS

May 12, 2016 Search Report issued in European Patent Application No. 15199904.2.

*Primary Examiner* — Theodore V Adamos
(74) *Attorney, Agent, or Firm* — Oliff PLC

(57) ABSTRACT

A panel structure includes a first panel that is made of resin and has a first flange portion, and a second panel that is made of resin and has a second flange portion that overlaps the first flange portion and is joined to the first flange portion by an adhesive, and an abutting portion that abuts against a tip end portion of the first flange portion. The second panel forms a closed sectional shape (a hollow chamber) with the first panel.

12 Claims, 7 Drawing Sheets

(56) References Cited

U.S. PATENT DOCUMENTS

2013/0049401 A1* 2/2013 Song .................... B21D 39/021
            296/191
2013/0318897 A1* 12/2013 Conterno ............ E04F 13/0894
            52/232

FOREIGN PATENT DOCUMENTS

| FR | 2548600 A1 | 1/1985 |
|----|------------|--------|
| JP | S63-151518 A | 6/1988 |
| JP | 2004-322865 A | 11/2004 |
| JP | 2006-341760 A | 12/2006 |
| JP | 2012-136166 A | 7/2012 |
| JP | 2013-129265 A | 7/2013 |
| JP | 2014-131896 A | 7/2014 |
| JP | 2014205491 A | 10/2014 |

\* cited by examiner

PANEL STRUCTURE

INCORPORATION BY REFERENCE

The disclosure of Japanese Patent Application No. 2014-253304 filed on Dec. 15, 2014 including the specification, drawings and abstract is incorporated herein by reference in its entirety.

BACKGROUND

1. Field of the Invention

The disclosed embodiments relate to a panel structure.

2. Description of Related Art

Japanese Patent Application Publication No. 2006-341760 (JP 2006-341760 A), for example, describes a panel structure that has an adhesive portion where a portion of a resin outer panel is adhered to a portion of a resin inner panel. The panel structure has an adhesion structure that reduces shearing stress applied to the adhesive portion, by external force applied to the outer panel and the inner panel.

However, when a load in the shearing direction is input to a joint formed by an adhesive between one panel and the other panel, the joint may peel apart if the load becomes equal to or greater than the shearing stress.

SUMMARY

Therefore, a panel structure is provided that is capable of inhibiting peeling at a joint formed by an adhesive between one panel and another panel, even if a load that is equal to or greater than a shearing stress is input to the joint.

Thus, one aspect of the disclosed embodiments relates to a panel structure that includes a first panel that is made of resin and has a first flange portion; a second panel that is made of resin, the second panel having a second flange portion and an abutting portion, the second flange portion being overlapped with the first flange portion; and an adhesive between the first flange portion and the second flange portion, the adhesive joining the first flange portion to the second flange portion, wherein the abutting portion of the second panel abuts against a tip end portion of the first flange portion, and the second panel joined to the first panel form a closed sectional shape (a chamber).

According to this panel structure, the second flange portion of the second panel overlaps the first flange portion and is joined to the first flange portion by an adhesive. Also, the tip end portion of the first flange portion abuts against the abutting portion of the second panel. Therefore, even if a load equal to or greater than the shearing force is input to the joint formed by the adhesive between the first flange portion and the second flange portion, this load is transmitted from the tip end portion of the first flange portion to the abutting portion of the second panel and distributed. Therefore, the joint formed by the adhesive between the first flange portion and the second flange portion is inhibited from peeling apart.

According to this panel structure, even if a load equal to or greater than the shearing force is input to the joint formed by an adhesive between the first flange portion and the second flange portion, this joint is able to be inhibited from peeling apart.

In the panel structure described above, the first flange portion may extend along an input direction of a load.

Also, in the panel structure described above, the abutting portion may be a flat surface.

According to the panel structure, of the tip end portion of the first flange portion and the abutting portion, the abutting portion of the second panel is a flat surface. Therefore, the transmission efficiency of a load from the tip end portion of the first flange portion to the abutting portion of the second panel improves.

According to this panel structure, the transmission efficiency of a load from the tip end portion of the first flange portion to the abutting portion of the second panel is able to be improved.

In the panel structure described above, the tip end portion of the first flange portion may be a flat surface.

Also, in the panel structure described above, the second panel may have a curved portion, and the abutting portion may be formed on an interior surface of the curved portion.

According to this panel structure, the abutting portion is formed on the interior surface of the curved portion. Therefore, the rigidity of the abutting portion improves.

According to this panel structure, the rigidity of the abutting portion is able to be improved.

In the panel structure described above, the curved portion may be curved by an amount that causes the second flange portion to extend along an input direction of a load.

Also, in the panel structure described above, the curved portion may include a position restricting portion that restricts a position of the tip end portion of the first flange portion relative to the second flange portion.

According to this panel structure, the position restricting portion that restricts a position of the tip end portion of the first flange portion relative to the second flange portion side is formed on the curved portion. Therefore, the first flange portion is even better inhibited or prevented from peeling away from the second flange portion.

According to this panel structure, the first flange portion is able to be even better inhibited or prevented from peeling away from the second flange portion.

In the panel structure described above, the position restricting portion may restrict the tip end portion of the first flange portion from moving in a direction opposite the second flange portion side (i.e., the position restricting portion may restrict the tip end portion of the first flange portion from moving away from the second flange portion).

Also, in the panel structure described above, the position restricting portion may be a protruding portion (i.e., a protrusion) that protrudes inwardly into the chamber.

According to this panel structure, the position restricting portion is a protruding portion that protrudes. Therefore, the position of the tip end portion of the first flange portion is effectively restricted to the second flange portion side (i.e., the tip end portion of the first flange portion is restricted from moving away from the second flange portion).

According to this panel structure, the position of the tip end portion of the first flange portion is able to be effectively restricted to the second flange portion side.

In the panel structure described above, the protruding portion may protrude in an input direction of a load.

In the panel structure described above, the position restricting portion may be an edge line portion that extends in a vehicle width direction at a vehicle body front side end portion of an inside surface of the curved portion.

Also, in the panel structure described above, the first panel may be one of an inner panel and an outer panel that forms a back door panel of a vehicle resin back door (a rear hatch), and the second panel may be the other of the inner panel and the outer panel.

According to this panel structure, the first panel is one of an inner panel and an outer panel that form a back door panel of a vehicle resin back door, and the second panel is the other of the inner panel and the outer panel. Therefore, even if a load of equal to or greater than the shearing force is input to the joining portion formed by the adhesive between the inner panel and the outer panel when the resin back door is firmly closed or the like, peeling at this joint is inhibited.

According to this panel structure, even if a load of equal to or greater than the shearing force is input to the joining portion between the inner panel and the outer panel when the resin back door is firmly closed or the like, peeling at this joint is able to be inhibited.

In the panel structure described above, the load is a load relatively input between the second panel and the first panel.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
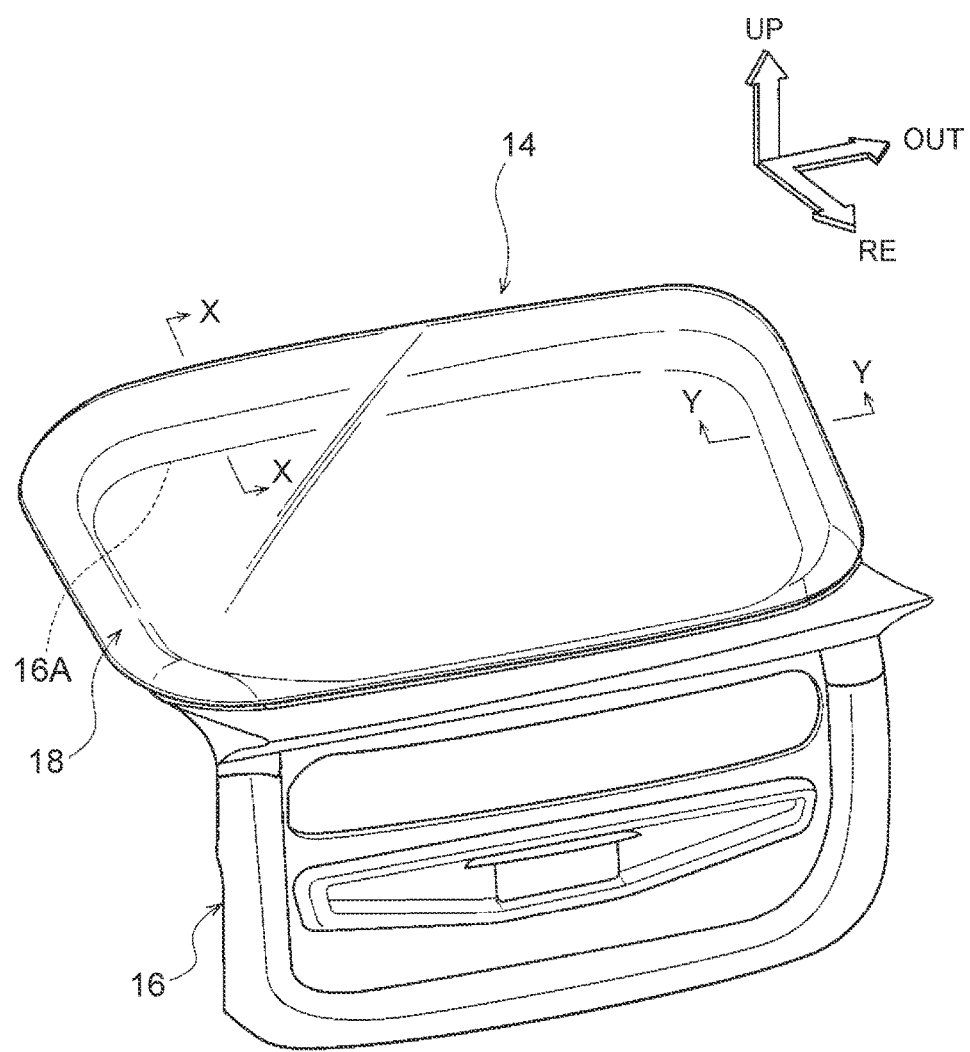
FIG. 1 is a perspective view of a vehicle resin back door (rear hatch) provided with a panel structure according to example embodiments.

Hereinafter, example embodiments will be described in detail with reference to the accompanying drawings. To simplify the description, a case will be described in which a panel structure 10 in the example embodiments is taken as an example. Therefore, in the drawings, arrow UP indicates a vehicle body upward direction, arrow RE indicates a vehicle body rearward direction, and arrow OUT indicates a vehicle width direction outside. Also, in the description below, unless otherwise specified, the directions of upper, lower, front, rear, and left and right indicate upper and lower in a vehicle body vertical direction, front and rear in a vehicle body front-rear direction, and left and right in a vehicle body left-right direction (vehicle width direction).

First Example Embodiment

First, a first example embodiment will be described. As shown in FIG. 1, a resin back door 14 provided on a rear portion of a vehicle body 12 (see FIGS. 2 and 4) includes a back door panel 16, and a back window glass 18 that closes off (covers) an opening 16A formed in an upper portion of the back door panel 16.

Figure 2:
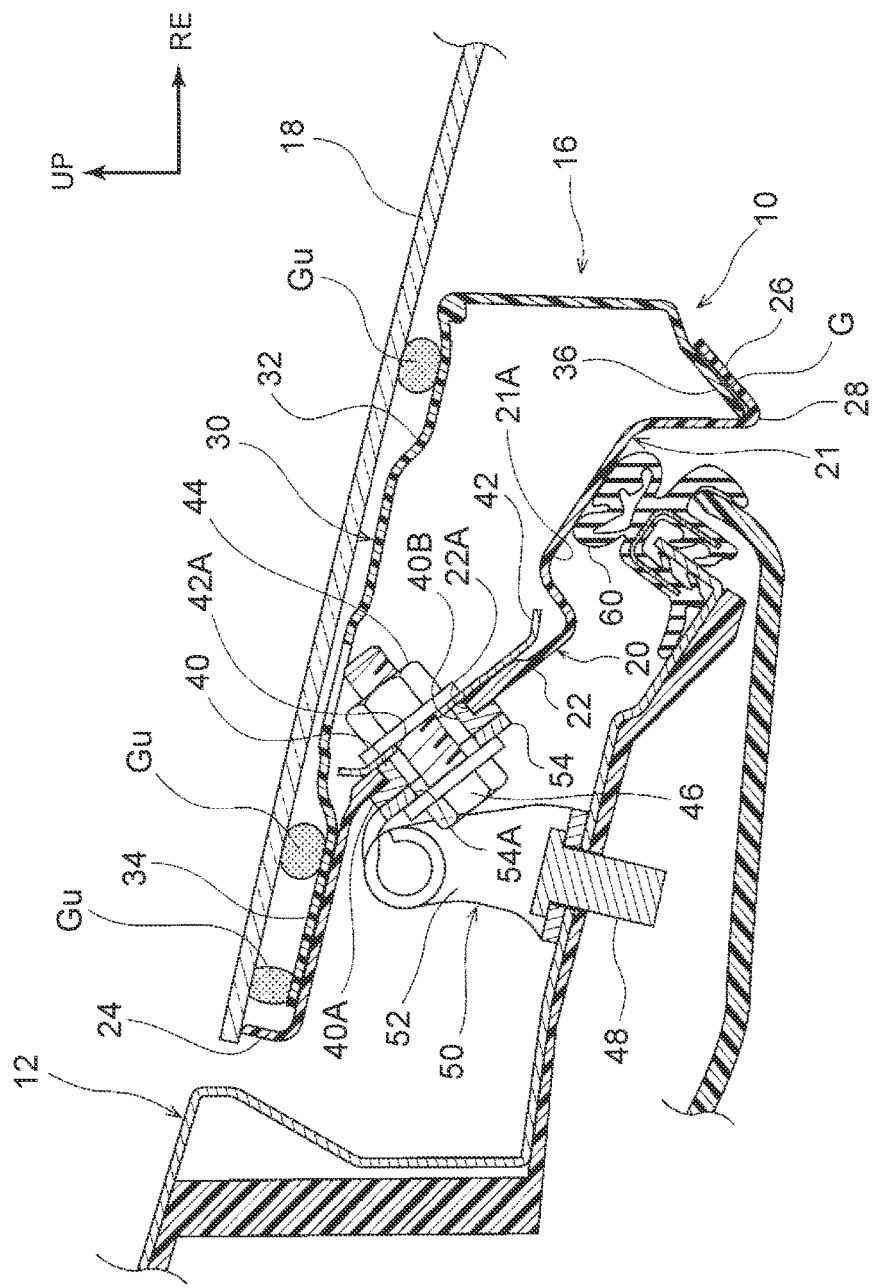
FIG. 2 is a sectional view taken along line X-X in FIG. 1, of a panel structure according to a first example embodiment.
Figure 4:
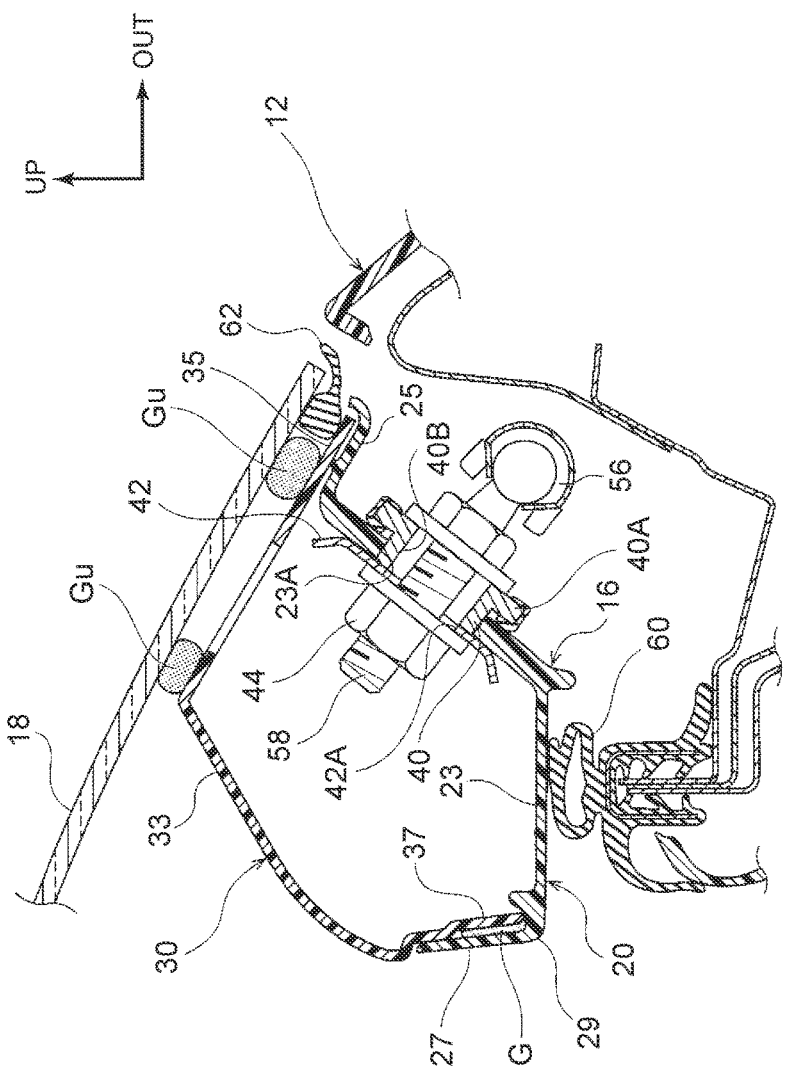
FIG. 4 is a sectional view taken along line Y-Y in FIG. 1, of the panel structure according to the first example embodiment.

As shown in FIGS. 2 and 4, the back door panel 16 has an inner panel 20 and an outer panel 30 that form a closed sectional shape by being joined together. That is, when viewed in cross section, the joined inner panel 20 and outer panel 30 enclose a chamber. The inner panel 20 and the outer panel 30 are made of a fiber reinforced resin material (FRP) such as carbon fiber reinforced resin material (CFRP).

As shown in FIG. 2, the inner panel 20 on an upper side edge portion side of the back door panel 16 has an inner panel main body 22 that extends in the vehicle width direction, a front flange portion 24 that is formed by a vehicle body front side end portion of the inner panel main body 22 being curved toward the vehicle body upper side, and a rear flange portion 26 formed by a vehicle body rear side end portion of the inner panel main body 22 being curved toward the vehicle body rear upper side.

The inner panel main body 22 is bolt fastened to a hinge portion 50 on the vehicle body 12 side. More specifically, a hinge portion main body 52 is fastened and fixed to the vehicle body 12 by a fastener 48 such as a bolt or rivet, and a plate portion 54 having a through-hole 54A for bolt-fastening is able to be rotatably supported on an upper end portion of the hinge portion main body 52.

Also, a through-hole 22A for bolt-fastening is also formed in the inner panel main body 22, and a cylindrical collar member 40 having a flange portion 40A is fitted into this through-hole 22A. Also, a metal retainer 42 that has a weld nut 44 and a through-hole 42A that is coaxially communicated with a through-hole 40B in the collar member 40, is provided inside a closed section of the inner panel main body 22.

Therefore, the inner panel 20 is fastened to the hinge portion 50 by (1) the flange portion 40A of the collar member 40 provided on the inner panel main body 22 being overlapped with the plate portion 54 of the hinge portion 50, (2) a bolt 46 being inserted through the through-hole 54A in the plate portion 54, the through-hole 40B in the collar member 40, and the through-hole 42A in the retainer 42, and (3) the bolt 46 being screwed into the weld nut 44.

Also, a recessed portion 21 that is recessed toward the vehicle body upper side is formed farther to the vehicle body rear side than the through-hole 22A and farther toward the vehicle body front side than the rear flange portion 26, in the inner panel main body 22. When the resin back door 14 is closed, a weather strip 60 provided on the vehicle body 12 side elastically deforms and contacts a bottom wall 21A of the recessed portion 21 with a predetermined pressure. That is, the inner panel 20 is pressed toward the vehicle body upper side by the elastic restoring force of the elastically deformed weather strip 60

Also, as shown in FIG. 2, the outer panel 30 on the upper side edge portion side of the back door panel 16 has an outer panel main body 32 that is formed having a general L-shaped cross-section and extends in the vehicle width direction, a front flange portion 34 that is formed on a vehicle body front side end portion of the outer panel main body 32, and a rear flange portion 36 formed by a vehicle body lower side (rear side) end portion of the outer panel main body 32 that is curved toward the vehicle lower side being curved at an obtuse angle toward the vehicle body front lower side.

Figure 3:
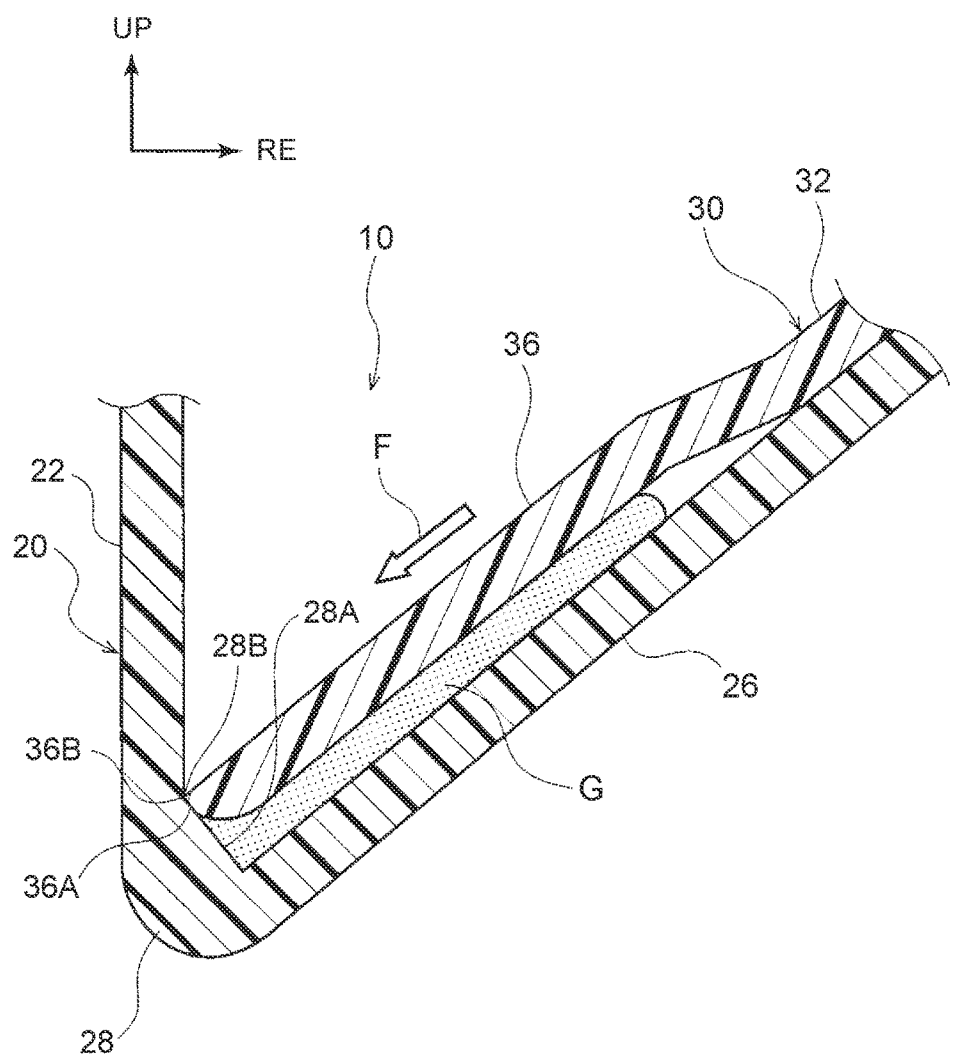
FIG. 3 is a partial enlarged sectional view of FIG. 2.

Therefore, a closed sectional shape (a shape defining an interior chamber) is formed on the upper side edge portion side of the back door panel 16 by the front flange portion 34 of the outer panel 30 being overlapped with the front flange portion 24 of the inner panel 20 from above and joined to the front flange portion 24 by an adhesive, and a rear flange portion 36 of the outer panel 30 being overlapped with the rear flange portion 26 of the inner panel 20 from the inside (the inside of the closed section) and joined to the rear flange portion 26 by an adhesive G (see FIG. 3).

A back window glass 18 is joined by a urethane adhesive Gu to an upper surface of the front flange portion 34 and an upper surface of the outer panel main body 32 of the outer panel 30. Also, an upper end portion of the front flange portion 24 of the inner panel 20 is abutting against an inside surface of the back window glass 18.

Here, a joining structure between the rear flange portion 26 of the inner panel 20 and the rear flange portion 36 of the outer panel 30 on the upper side edge portion side of the back door panel 16 will be described. In FIGS. 2 and 3, the outer panel 30 functions as a first panel, and the inner panel 20 functions as a second panel. Therefore, the rear flange portion 36 functions as a first flange portion, and the rear flange portion 26 functions as a second flange portion.

As shown in FIGS. 2 and 3, the vehicle body rear side of the inner panel main body 22 is arranged extending in a direction intersecting an input direction of a load F that will be described later. Therefore, in order to arrange the rear flange portion 26 so as to extend along the input direction of the load F that will be described later, the rear flange portion 26 is formed by the vehicle body rear side end portion of the inner panel main body 22 being curved at an acute angle toward the vehicle body rear upper side. Also, the curved corner is a curved portion 28, and a tip end portion (tip end surface) 36A of the rear flange portion 36 of the outer panel 30 is abutting against an inside surface (a surface inside the closed section) 28A of the curved portion 28.

More specifically, the tip end portion 36A of the rear flange portion 36 of the outer panel 30 is a flat surface that is orthogonal to the extending direction of the rear flange portion 36, and the inside surface 28A of the curved portion 28 is also a flat surface that is orthogonal to the extending direction of the rear flange portion 36. Therefore, the tip end portion 36A of the rear flange portion 36 of the outer panel 30 makes surface-to-surface contact with the inside surface 28A of the curved portion 28, the inside surface 28A being an abutting portion.

An edge line portion 36B on the vehicle body front side of the tip end portion 36A of the rear flange portion 36 is restricted to a position on the rear flange portion 26 side by an edge line portion 28B that extends in the vehicle width direction at the vehicle body front side end portion of the inside surface 28A of the curved portion 28. In other words, the tip end portion 36A of the rear flange portion 36 is able to be effectively restricted from moving in a direction opposite the rear flange portion 26 side (a direction away from the rear flange portion 26), i.e., the edge line portion 28B of the curved portion 28 serves as a position restricting portion for the tip end portion 36A of the rear flange portion 36.

Also, a vehicle body rear side portion of the tip end portion 36A of the rear flange portion 36 is formed having an arc-shaped cross-section. As a result, the joint area (the area where adhesive exists) on the tip end portion 36A side of the rear flange portion 36 of the outer panel 30 with respect to the rear flange portion 26 of the inner panel 20 increases, so joint strength on the tip end portion 36A side with respect to the curved portion 28 (inside surface 28A) is greater.

On the other hand, as shown in FIG. 4, the inner panel 20 on both the left and right side edge portion sides of the back door panel 16 has an inner panel main body 23 that is formed having a generally L-shaped cross-section and extends in the vehicle body front-rear direction, an outer flange portion 25 formed by a vehicle width direction outside end portion of the inner panel main body 23 being curved toward the vehicle width direction outside, and an inner flange portion 27 formed by a vehicle width direction inside end portion of the inner panel main body 23 being curved toward the vehicle body upper side.

A ball joint 56 to which one end portion of a damper, not shown, is attached is fastened to a vehicle width direction outside portion of the inner panel main body 23. More specifically, a through-hole 23A for ball joint fastening is formed in a vehicle width direction outside portion of the inner panel main body 23, and the cylindrical collar member 40 that has the flange portion 40A is fitted into this through-hole 23A.

Then, the metal retainer 42 that has the weld nut 44 and the through-hole 42A that is coaxially communicated with the through-hole 40B in the collar member 40 is provided inside the closed section of the inner panel main body 23. Therefore, the ball joint 56 is fastened to the inner panel main body 23 by a threaded portion 58 of the ball joint 56 being inserted through the through-hole 40B in the collar member 40 and the through-hole 42A in the retainer 42, and screwed into the weld nut 44.

Then, when the resin back door 14 is closed, a weather strip 60 provided on the vehicle body 12 side elastically deforms and contacts the vehicle width direction inside portion of the inner panel main body 23 with a predetermined pressure. That is, the inner panel 20 is pressed toward the vehicle body upper side by the elastic restoring force of the elastically deformed weather strip 60.

Also, as shown in FIG. 4, the outer panel 30 on both the left and right side edge portion sides of the back door panel 16 has an outer panel main body 33 that has a generally L-shaped cross-section and extends in the vehicle body front-rear direction, an outer flange portion 35 that is formed on a vehicle width direction outside end portion of the outer panel main body 33, and an inner flange portion 37 formed by a vehicle width direction inside end portion of the outer panel main body 33 being curved toward the vehicle body lower side.

Figure 5:
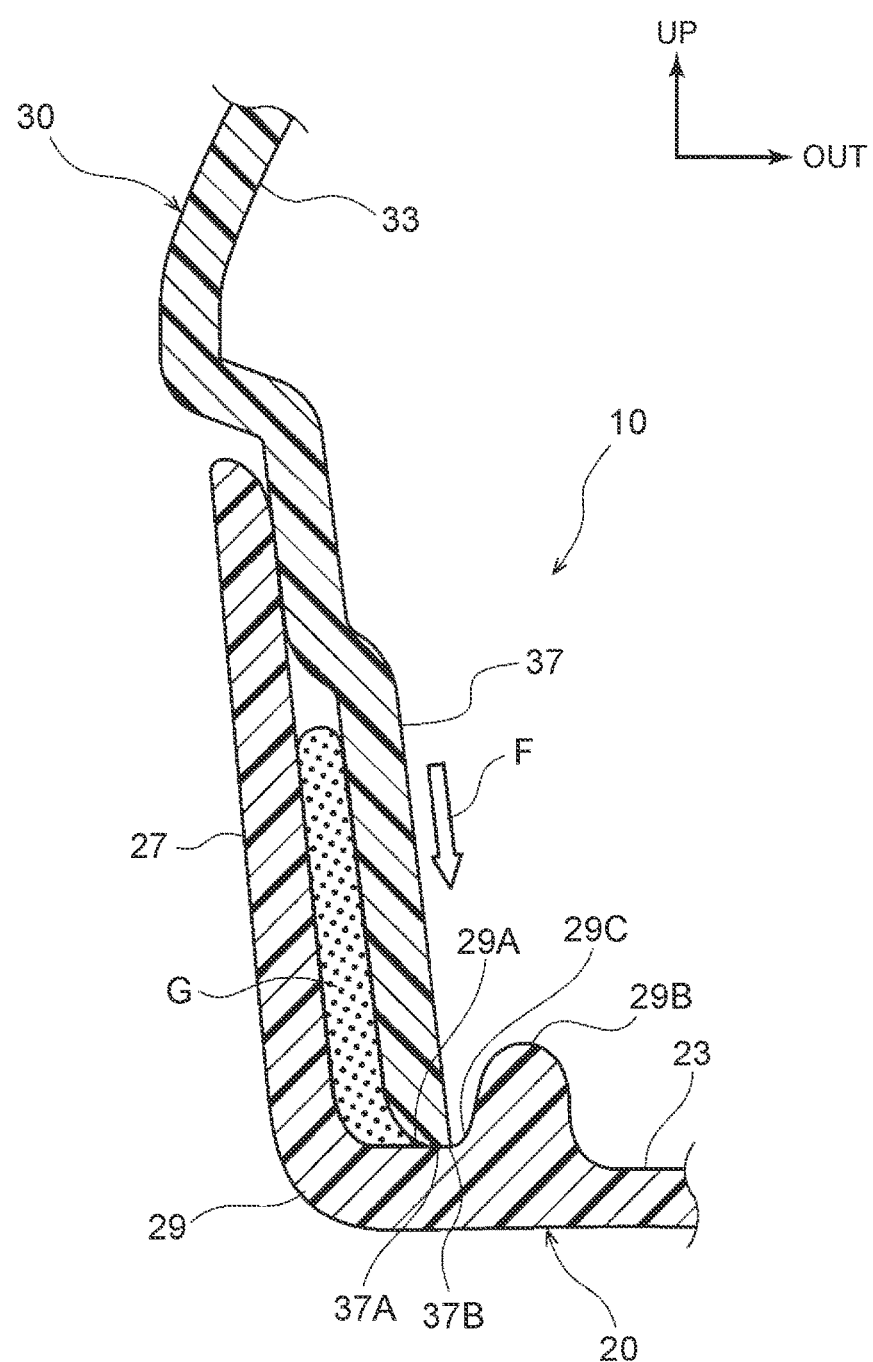
FIG. 5 is a partial enlarged sectional view of FIG. 2.

Therefore, a closed sectional shape (a shape defining an interior chamber) is formed on both the left and right side edge portion sides of the back door panel 16 by the outer flange portion 35 of the outer panel 30 being overlapped from above with the outer flange portion 25 of the inner panel 20 and joined to the outer flange portion 25 by an adhesive, and the inner flange portion 37 of the outer panel 30 being overlapped from the inside (inside the closed section) with the inner flange portion 27 of the inner panel 20 and joined to the inner flange portion 27 by the adhesive G (see FIG. 5).

The back window glass 18 is joined by the urethane adhesive Gu to an upper surface of the outer flange portion 35 and an upper surface of the outer panel main body 33 of the outer panel 30. Also, a water stopping lip 62 is provided between the back window glass 18 and the vehicle width direction outside end portion of the outer flange portion 35 of the outer panel 30.

Here, the joining structure between the inner flange portion 27 of the inner panel 20 and the inner flange portion 37 of the outer panel 30 on both the left and right side edge portion sides of the back door panel 16 will be described. In FIGS. 4 and 5, the outer panel 30 functions as a first panel, and the inner panel 20 functions as the second panel. Therefore, the inner flange portion 37 functions as the first flange portion, and the inner flange portion 27 functions as the second flange portion.

As shown in FIGS. 4 and 5, the vehicle width direction inside of the inner panel main body 23 is arranged extending in a direction intersecting the input direction of a load F that will be described later. Therefore, in order to arrange the inner flange portion 27 to extend along the input direction of the load F that will be described later, the inner flange portion 27 is formed by the vehicle width direction inside end portion of the inner panel main body 23 being curved at a substantially right angle toward the vehicle body upper side. The curved corner is a curved portion 29, and a tip end portion (a tip end surface) 37A of the inner flange portion 37 of the outer panel 30 abuts against an inside surface (a surface on the inside of the interior chamber formed by the joined panels 20 and 30) 29A of this curved portion 29.

More specifically, the tip end portion 37A of the inner flange portion 37 of the outer panel 30 is a flat surface that is orthogonal to the extending direction of the inner flange portion 37, and the inside surface 29A of the curved portion 29 is also a flat surface that is orthogonal to the extending direction of the inner flange portion 37. Therefore, the tip end portion 37A of the inner flange portion 37 of the outer panel 30 makes surface-to-surface contact with the inside surface 29A of the curved portion 29, the inside surface 29A being an abutting portion.

Also, a protruding portion (or protrusion) 29B that protrudes in the input direction of the load F that will be described later is integrally formed on the inside surface 29A of the curved portion 29. An edge line portion 37B on the vehicle width direction outside of the tip end portion 37A of the inner flange portion 37 is restricted to a position on the inner flange portion 27 side by an edge line portion 29C on the vehicle width direction inside of this protruding portion 29B. In other words, the tip end portion 37A of the inner flange portion 37 is able to be effectively restricted from moving in a direction opposite the inner flange portion 27 side (a direction away from the inner flange portion 27), i.e., the edge line portion 29C of the protruding portion 29B serves as a position restricting portion for the tip end portion 37A of the inner flange portion 37.

Also, a vehicle width direction inside portion of the tip end portion 37A of the inner flange portion 37 is formed having an arc-shaped cross-section. As a result, the joint area (the area where adhesive exists) on the tip end portion 37A side of the inner flange portion 37 of the outer panel 30 with respect to the inner flange portion 27 of the inner panel 20 increases, so the joint strength on the tip end portion 37A side with respect to the curved portion 29 (inside surface 29A) is greater.

Next, the operation of the vehicle resin back door 14 provided with the panel structure 10 according to the first example embodiment having a structure such as that described above will be described.

When the resin back door 14 is thinly closed, pressure is applied from the vehicle body lower side to the recessed portion 21 of the inner panel 20 by the weather strip 60, on the upper side edge portion side of the back door panel 16. That is, a load F (see FIG. 3) is relatively input from the outer panel 30 to the inner panel 20, the position of which is restricted by the weather strip 60. In other words, the load F is relatively input between the inner panel 20 and the outer panel 30.

When this occurs, shearing force in the input direction of the load F is applied to the joint between the rear flange portion 26 of the inner panel 20 and the rear flange portion 36 of the outer panel 30. That is, shearing force in the input direction of the load F is applied to the adhesive G that joins the rear flange portion 26 and the rear flange portion 36 together. If the load F that is input here becomes equal to or greater than this shearing force, the rear flange portion 26 and the rear flange portion 36 may peel apart.

However, in this example embodiment, the tip end portion 36A of the rear flange portion 36 of the outer panel 30 is abutting against the inside surface 28A (the abutting portion) of the curved portion 28 of the inner panel 20. Therefore, the load F that is relatively input to the inner panel 20 from the outer panel 30 is transmitted from the tip end portion 36A of the rear flange portion 36 of the outer panel 30 to the curved portion 28 of the inner panel 20 and distributed.

In particular, in this example embodiment, the tip end portion 36A of the rear flange portion 36 and the inside surface 28A of the curved portion 28 are both flat surfaces, so the transmission efficiency of this load F is able to be improved. Accordingly, a load F equal to or greater than the shearing force is less apt to be input to the adhesive G that joins the rear flange portion 26 and the rear flange portion 36 together, and as a result, the rear flange portion 26 and the rear flange portion 36 are able to be inhibited or prevented from peeling apart.

The inside surface 28A against which the tip end portion 36A of the rear flange portion 36 abuts is formed on the curved portion 28 that curves in a direction intersecting the input direction of the load F. Therefore, the rigidity of this inside surface 28A is able to be better ensured (i.e., improved). Also, the edge line portion 28B (the position restricting portion) that restricts the position of the tip end portion 36A (the edge line portion 36B) of the rear flange portion 36 is formed on the curved portion 28, so the rear flange portion 36 is able to be even better inhibited or prevented from peeling away from the rear flange portion 26.

Moreover, both the left and right side edge portion sides of the back door panel 16 are also the same. That is, when the resin back door 14 is firmly closed, pressure is applied to the inner panel 20 from the vehicle body lower side by the weather strip 60 on both the left and right side edge portion sides of the back door panel 16. That is, the load F (see FIG. 5) is relatively input from the outer panel 30 to the inner panel 20, the position of which is restricted by the weather strip 60. In other words, the load F is relatively input between the inner panel 20 and the outer panel 30.

When this occurs, shearing force in the input direction of the load F is applied to the joint between the inner flange portion 27 of the inner panel 20 and the inner flange portion 37 of the outer panel 30. That is, shearing force in the input direction of the load F is applied to the adhesive G that joins the inner flange portion 27 and the inner flange portion 37 together. If the load F that is input here becomes equal to or greater than this shearing force, the inner flange portion 27 and the inner flange portion 37 may peel apart.

However, in this example embodiment, the tip end portion 37A of the inner flange portion 37 of the outer panel 30 is abutting against the inside surface 29A (the abutting portion) of the curved portion 29 of the inner panel 20. Therefore, the load F that is relatively input to the inner panel 20 from the outer panel 30 is transmitted from the tip end portion 37A of the inner flange portion 37 of the outer panel 30 to the curved portion 29 of the inner panel 20 and distributed.

In particular, in this example embodiment, the tip end portion 37A of the inner flange portion 37 and the inside surface 29A of the curved portion 29 are both flat surfaces, so the transmission efficiency of this load F is able to be improved. Accordingly, a load F equal to or greater than the shearing force is less apt to be input to the adhesive G that joins the inner flange portion 27 and the inner flange portion 37 together, and as a result, the inner flange portion 27 and the inner flange portion 37 are able to be inhibited or prevented from peeling apart.

The inside surface 29A against which the tip end portion 37A of the inner flange portion 37 abuts is formed on the curved portion 29 that curves in a direction intersecting the input direction of the load F. Therefore, the rigidity of this inside surface 29A is able to be better ensured (i.e., improved). Also, the edge line portion 29C (the protruding portion 29B/the position restricting portion) that restricts the position of the tip end portion 37A (the edge line portion 37B) of the inner flange portion 37 is formed on the curved portion 29, so the tip end portion 37A of the inner flange portion 37 is able to be effectively restricted to the inner flange portion 27 side. In other words, the tip end portion 37A of the inner flange portion 37 is able to be effectively restricted from moving toward the side opposite the inner flange portion 27 side, so the inner flange portion 37 is able to be even better inhibited or prevented from peeling away from the inner flange portion 27.

Second Example Embodiment

Next, a second example embodiment will be described. Portions in this second example embodiment that are equivalent to portions in the first example embodiment described above will be denoted by like reference characters and detailed descriptions (including common operation) of those portions will be omitted as appropriate.

Figure 6:
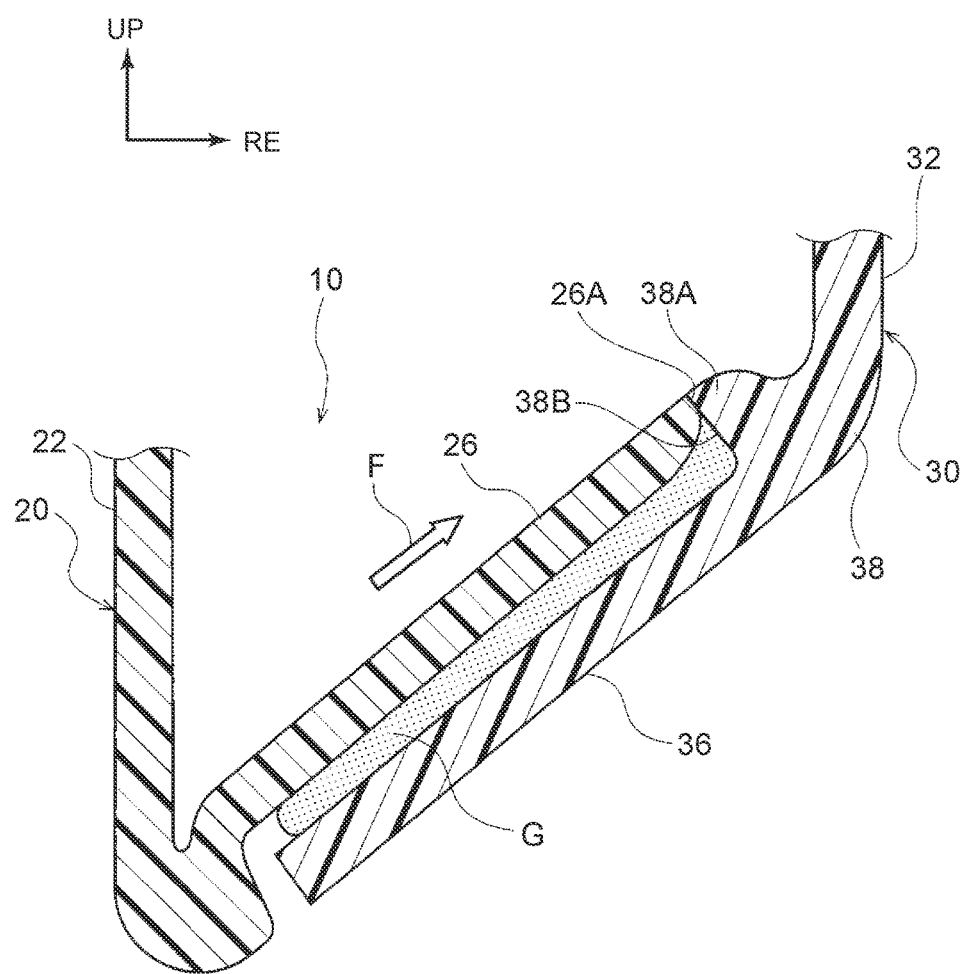
FIG. 6 is an enlarged sectional view corresponding to FIG. 3, of a panel structure according to a second example embodiment.

As shown in FIG. 6, in this second example embodiment, the manner in which the rear flange portion 26 of the inner panel 20 and the rear flange portion 36 of the outer panel 30 on the upper side edge portion side of the back door panel 16 overlap is the opposite that in the first example embodiment. That is, the rear flange portion 26 of the inner panel 20 overlaps the rear flange portion 36 of the outer panel 30 from the inside (inside the closed section), and is joined to the rear flange portion 36 by the adhesive G.

Here, the joining structure between the rear flange portion 26 of the inner panel 20 and the rear flange portion 36 of the outer panel 30 on the upper side edge portion side of the back door panel 16 will be described. In FIG. 6, the inner panel 20 functions as the first panel, and the outer panel 30 functions as the second panel. Therefore, the rear flange portion 26 functions as the first flange portion, and the rear flange portion 36 functions as the second flange portion.

As shown in FIG. 6, the vehicle body lower side (rear side) of the outer panel main body 32 is arranged extending in a direction intersecting the input direction of the load F. Therefore, in order to arrange the rear flange portion 36 along the input direction of the load F, the rear flange portion 36 is formed by the vehicle body lower side (rear side) end portion of the outer panel main body 32 being curved at an obtuse angle toward the vehicle body front lower side. Also, the curved corner is a curved portion 38, and a tip end portion (tip end surface) 26A of the rear flange portion 26 of the inner panel 20 is abutting against a protruding portion 38A that is provided protruding on an inside surface (a surface inside the closed section) of this curved portion 38.

More specifically, the tip end portion 26A of the rear flange portion 26 of the inner panel 20 is a flat surface that is orthogonal to the extending direction of the rear flange portion 26, and a flat surface portion 38B that is orthogonal to the extending direction of the rear flange portion 26 is also formed on the protruding portion 38A of the curved portion 38. Therefore, the tip end portion 26A of the rear flange portion 26 of the inner panel 20 makes surface-to-surface contact with the flat surface portion 38B of the protruding portion 38A of the curved portion 38, the flat surface portion 38B being an abutting portion.

Therefore, when the resin back door 14 is firmly closed, the load F that is relatively input from the inner panel 20, the position of which is restricted by the weather strip 60, to the outer panel 30 is transmitted from the tip end portion 26A of the rear flange portion 26 of the inner panel 20 to the protruding portion 38A (the curved portion 38) of the outer panel 30 and distributed. Thus, a load F equal to or greater than the shearing force is less apt to be input to the adhesive G that joins the rear flange portion 26 and the rear flange portion 36 together, and as a result, the rear flange portion 26 and the rear flange portion 36 are able to be inhibited or prevented from peeling apart.

In this way, in this second example embodiment in which the manner in which the rear flange portion 26 of the inner panel 20 and the rear flange portion 36 of the outer panel 30 at the upper side edge portion of the back door panel 16 overlap is the opposite to that in the first example embodiment, operation and effects equivalent to those of the first example embodiment are able to be obtained as well. In this second example embodiment, the vehicle body rear side portion of the tip end portion 26A of the rear flange portion 26 is formed having an arc-shaped cross-section.

Figure 7:
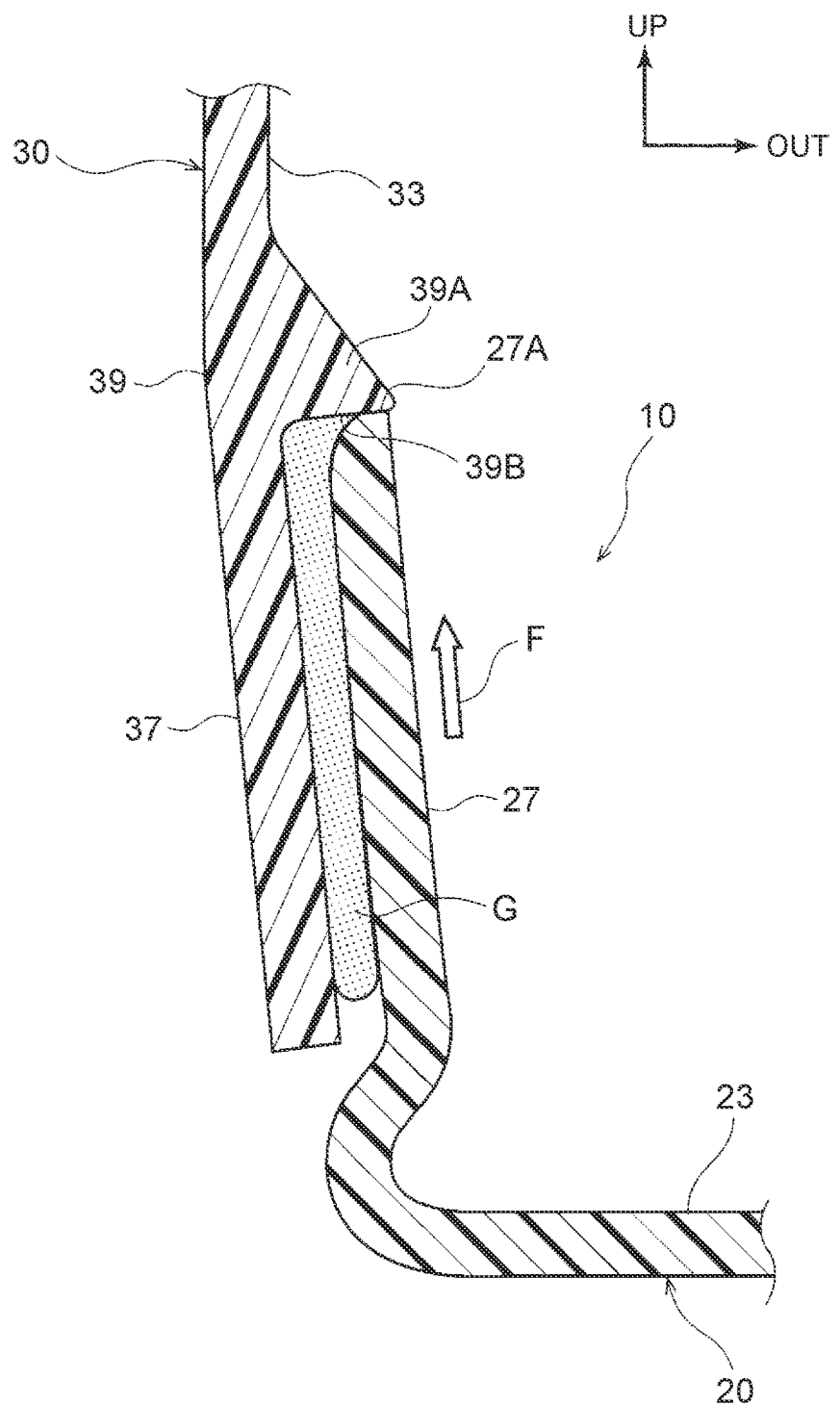
FIG. 7 is an enlarged sectional view corresponding to FIG. 5, of the panel structure according to the second example embodiment.

Also, as shown in FIG. 7, in this second example embodiment, the manner in which the inner flange portion 27 of the inner panel 20 and the inner flange portion 37 of the outer panel 30 on both the left and right side edge portion sides of the back door panel 16 overlap is opposite to that in the first example embodiment. That is, the inner flange portion 27 of the inner panel 20 overlaps the inner flange portion 37 of the outer panel 30 from the inside (inside the closed section), and is joined to the inner flange portion 37 by the adhesive G.

Here, the joining structure between the inner flange portion 27 of the inner panel 20 and the inner flange portion 37 of the outer panel 30 on both of the left and right side edge portion sides of the back door panel 16 will be described. In FIG. 7, the inner panel 20 functions as the first panel, and the outer panel 30 functions as the second panel. Therefore, the inner flange portion 27 functions as the first flange portion, and the inner flange portion 37 functions as the second flange portion.

As shown in FIG. 7, the vehicle width direction inside of the outer panel main body 33 is arranged extending in a direction that intersects the input direction of the load F. Therefore, in order to arrange the inner flange portion 37 along the input direction of the load F, the inner flange portion 37 is formed by the vehicle width direction inside end portion of the outer panel main body 33 being curved at an obtuse angle downward toward the vehicle width direction outside. Also, the curved corner is a curved portion 39, and a tip end portion (tip end surface) 27A of the inner flange portion 27 of the inner panel 20 is abutting against a protruding portion 39A that is provided protruding on an inside surface (a surface inside the closed section) of this curved portion 39.

More specifically, the tip end portion 27A of the inner flange portion 27 of the inner panel 20 is a flat surface that is orthogonal to the extending direction of the inner flange portion 27, and a flat surface portion 39B that is orthogonal to the extending direction of the inner flange portion 27 is also formed on the protruding portion 39A of the curved portion 39. Therefore, the tip end portion 27A of the inner flange portion 27 of the inner panel 20 contacts the flat surface portion 39B of the protruding portion 39A of the curved portion 39 via a surface, the flat surface portion 39B being an abutting portion.

Therefore, when the resin back door 14 is firmly closed, the load F that is relatively input from the inner panel 20, the position of which is restricted by the weather strip 60, to the outer panel 30 is transmitted from the tip end portion 27A of the inner flange portion 27 of the inner panel 20 to the protruding portion 39A (the curved portion 39) of the outer panel 30 and distributed. Thus, a load F equal to or greater than the shearing force is less apt to be input to the adhesive G that joins the inner flange portion 27 and the inner flange portion 37 together, and as a result, the inner flange portion 27 and the inner flange portion 37 are able to be inhibited or prevented from peeling apart.

In this way, in this second example embodiment in which the manner in which the inner flange portion 27 of the inner panel 20 and the inner flange portion 37 of the outer panel 30 at both the left and right side edge portions of the back door panel 16 overlap is the opposite to that in the first example embodiment, operation and effects equivalent to those of the first example embodiment are able to be obtained as well. In this second example embodiment, the vehicle body rear side portion of the tip end portion 27A of the inner flange portion 27 is formed having an arc-shaped cross-section.

Heretofore, the panel structure 10 according to these example embodiments is described based on the drawings, but the panel structure 10 according to these example embodiments is not limited to the drawings. That is, appropriate design modifications are also possible without departing from the scope of the disclosed embodiments. For example, the inner panel 20 and the outer panel 30 are not limited to being made of fiber reinforced resin material (FRP).

Also, as long as the structure is such that the load F is able to be efficiently transmitted to the inside surface 28A and 29A of the curved portion 28 and 29 that is a flat surface, and the flat surface portion 38B and 39B of the curved portion 38 and 39, the tip end portion 26A and 36A of the rear flange portion 26 and 36, and the tip end portion 27A and 37A of the inner flange portion 27 and 37 do not have to each be a flat surface.

Also, even if the load F is input, as long as the joined state between the rear flange portions 26 and 36 and the inner flange portions 27 and 37 is well maintained, the edge line portions 28B and 29C as the position restricting portion do not have to be formed on the curved portions 28 and 29. Furthermore, the panel structure 10 according to the example embodiments is not limited to a structure that is applied to the vehicle resin back door 14.

What is claimed is:

1. A panel structure of a vehicle door, the panel structure comprising:
a first panel that is made of resin and has a first flange portion configured with a flat first side surface extending in a first direction to a terminal end;
a second panel that is made of resin, the second panel having a second flange portion and an abutting portion, the second flange portion configured with a flat second side surface extending in the first direction, the second flange portion being overlapped with the first flange portion so as to form a chamber;
an adhesive between the first flange portion and the second flange portion, the adhesive joining the first side surface of the first flange portion to the second side surface of the second flange portion;
a weather strip having a closed cross-sectional shape attached to the second panel;
a window glass bonded to only one of the first panel and the second panel at two discreet points; wherein
the terminal end of the first panel is configured with a flat distal tip end surface and curved portion connecting the flat distal tip end surface of the first panel to the flat first side surface of the first panel,
the abutting portion of the second panel includes an abutting surface that extends in a second direction that is different from the first direction, the abutting surface abuts against the flat distal tip end surface of the terminal end of the first flange portion,
the curved portion of the terminal end of the first flange portion faces the abutting surface and is spaced from the abutting surface to define a gap between the abutting surface and the curved portion of the terminal end of the first flange portion,
the adhesive extends into the gap between the abutting surface and the curved portion of the terminal end of the first flange portion,
the weather strip is oriented on the second panel such that closing of the vehicle door against the weather strip causes a shearing force to the adhesive, between the first flange portion and the second flange portion, in a direction parallel to the first direction.

2. The panel structure according to claim 1, wherein the abutting surface is a flat surface.

3. The panel structure according to claim 1, wherein the second panel has a curved portion, and the abutting portion is formed on an interior surface of the curved portion of the second panel.

4. The panel structure according to claim 3, wherein the curved portion of the second panel is curved by an amount that causes the second flange portion to extend along the direction in which the shear force is applied when the vehicle door is closed.

5. The panel structure according to claim 3, wherein the curved portion of the second panel includes a position restricting portion that restricts a position of the terminal end of the first flange portion relative to the second flange portion.

6. The panel structure according to claim 5, wherein the position restricting portion restricts the terminal end of the first flange portion from moving away from the second flange portion.

7. The panel structure according to claim 5, wherein the position restricting portion is a protrusion that protrudes inwardly into a chamber formed between opposite ends of the first and second panels.

8. The panel structure according to claim 7, wherein the protrusion protrudes in the direction in which the shear force is applied when the vehicle door is closed.

9. The panel structure according to claim 5, wherein the panel structure is part of a vehicle back door, and the position restricting portion is an edge line portion that extends in a vehicle width direction of the vehicle at a vehicle body front side end portion of the interior surface of the curved portion of the second panel.

10. The panel structure according to claim 1, wherein the first panel is one of an inner panel and an outer panel that form a back door panel of a vehicle resin back door, and the second panel is the other of the inner panel and the outer panel.

11. The panel structure according to claim 1, wherein the first panel and the second panel each have second abutting surfaces, the respective second abutting surfaces oriented proximal to the first flange portion and second flange portion respectively, such that the adhesive is oriented between the second abutting surfaces and the abutting surface of the second panel.

12. The panel structure according to claim 1, further comprising a hinge connected only to the second panel and oriented such that the closing of the vehicle door along the hinge causes the shearing force to the adhesive, between the first flange portion and the second flange portion, in the direction parallel to the first direction.

* * * * *